Jan. 6, 1931.  S. WILLIAMS  1,787,740
MACHINE FOR CLEANING SEED COTTON
Filed April 14, 1928  2 Sheets-Sheet 1
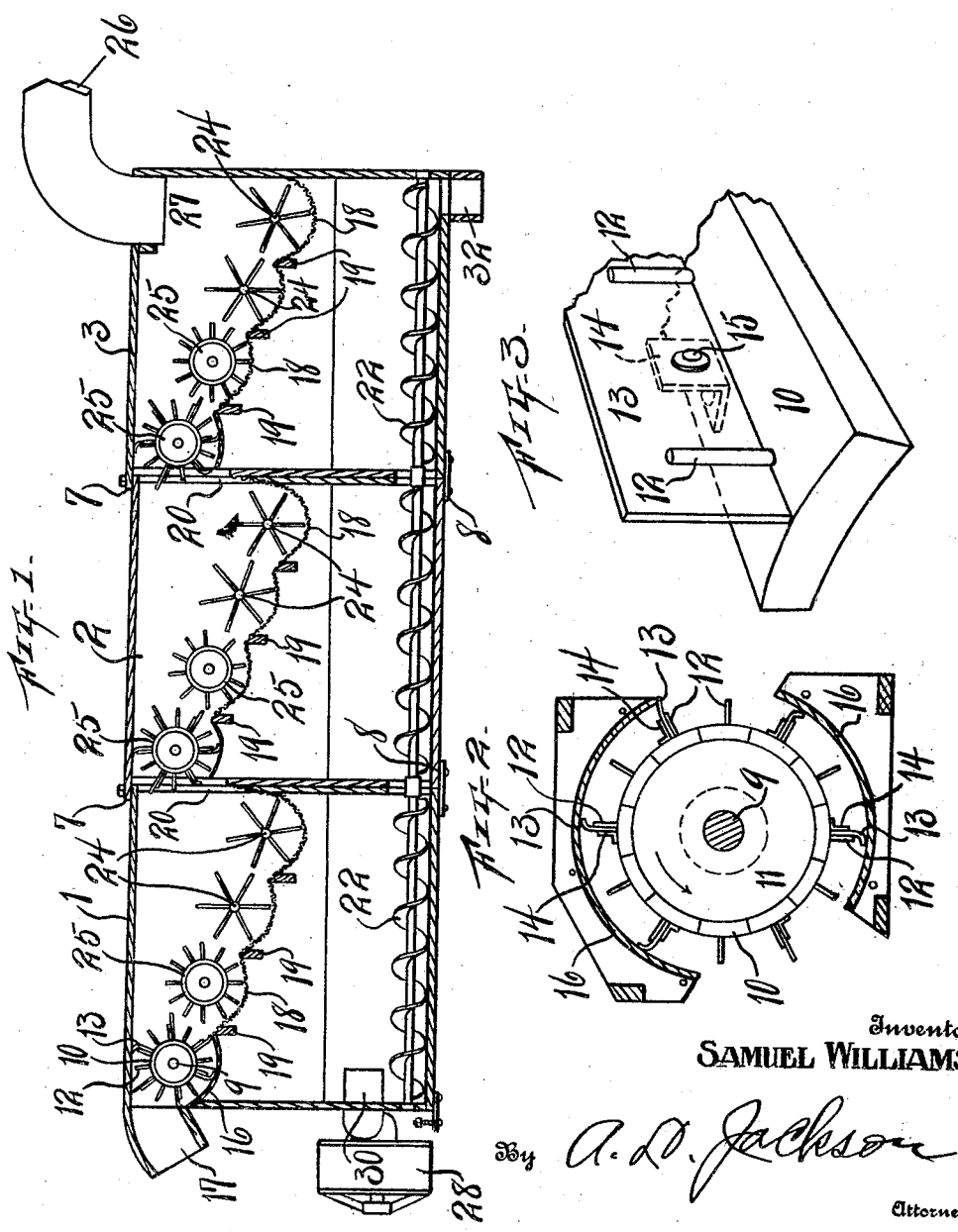

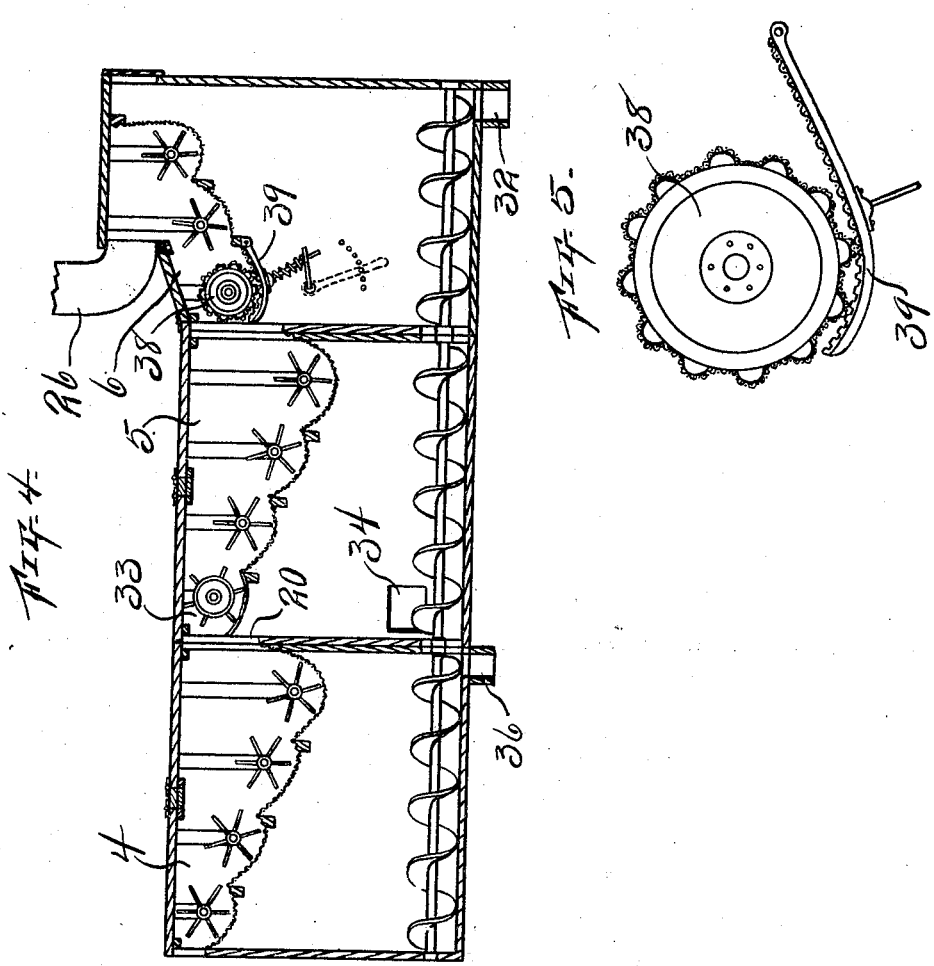

Patented Jan. 6, 1931

1,787,740

UNITED STATES PATENT OFFICE

SAMUEL WILLIAMS, OF ELK CITY, OKLAHOMA

MACHINE FOR CLEANING SEED COTTON

Application filed April 14, 1928. Serial No. 269,910.

My invention relates to cotton cleaning machines and more particularly to machines for separating dust and hulls and other trash from seed cotton and to provide the machine with a plurality of detachable units which are replaceable and to construct the machine so that additional units may be added when necessary or required; and the object is to provide machines which will be more economical and efficient in operation and which are provided with more efficient vacuum creating means, and more efficient separating means, consisting of picker rollers which are provided with different lengths of beaters and pickers, and which are provided with improved screen and unit construction. Other objects and advantages will be fully explained in the following description and the invention will be more particularly pointed out in the claims.

Reference is had to the accompanying drawings which form a part of this application.

Fig. 1 is a longitudinal vertical section of the machine casing and frame.

Fig. 2 is an enlarged detail view of the vacuum maintainer.

Fig. 3 is a perspective view, illustrating on a larger scale the wing or vane and spike construction.

Fig. 4 is a longitudinal section of a casing, being a continuation of the machine shown in Fig. 1 but showing an attachment for crushing bolls inserted in the casing adjacent to the pipe line 26.

Fig. 5 is an enlarged detail view of the boll crusher shown in Fig. 4.

Similar characters of reference are used to indicate the same parts throughout the several views.

The improved machine is provided with a plurality of units 1, 2, 3, 4, 5, and 6 which may be connected by overlapping parts 7 which are attached to the next adjacent unit, and which are connected on the bottom by cleats 8. The member 2 can be uncoupled from either member 1 or member 3 and an additional unit, duplicate of unit, inserted. The vacuum maintainer consists of a shaft 9, (shown in my pending application, Ser. No. 229,705), a plurality of bars 10 attached to the disks 11 which are rigid with the shaft 9 to complete a drum of the bars 10, and spikes 12 radially arranged and made rigid with the bars 10. The spikes 12 serve to loosen the seed cotton and move the same through the vacuum maintainer. Flexible wings or vanes 13 are attached to the bars 10 by brackets 14 and bolts 15. Curved casing members 16 cooperate with the flexible members 13 to create a partial vacuum and this vacuum is substantially constant by reason of the rapid revolution of the drum 10. Spiked picker drums 25 and beater drums 24 are mounted in each of the units 1, 2, 3, 4, 5, and 6. The beaters 24 permit a freer passage of air and cotton than the pickers 25 so that the cotton will strike the pickers 25 with more force and do better service in separating the trash from the seed cotton. The beaters 24 are placed in the lower spaces of the screens 18 in each unit for better handling of over supplies of cotton which may be delivered from one unit to the next. The screens 18 are so positioned relative to the picker rollers and the beaters that the cotton will be more thoroughly scrubbed against the screens. Cotton is drawn into the machine through an air line or pipe 26 which extends to a wagon or other receptacle from which the cotton is to be taken direct to the inlet 27 and moved along by the beaters 24 and pickers 25. The cotton is discharged by the vacuum maintainer through a discharge spout 17. Screens 18 are attached to the interior of the casings and supported under the beaters 24 and pickers 25 by bars 19 to which the screens are attached. A draft is created through all the casings 1 to 6 inclusive if necessary for separating the trash and dirt from the cotton. The trash and dirt and heavier material will fall through the screens 18 towards the bottom of the units. Openings 20 are made in the adjacent end walls of the units 1 to 6 so that the suction will draw the dust and other matter through the screens 18 by reason of the fact that the screens 18 are set at angles to the horizontal position of the machine. Suction is created by means of a fan 28 which is connected to the discharge opening 30. A draft will be created in the air or pipe line 26 and this draft will draw the dust and trash through the units 1 to 6 and through the screens 18 because the openings 20 are approximately in line with the openings 20. The dust and trash will fall towards the spiral conveyor 22 which will move the trash and dirt towards the discharge 32 and this discharge is to be provided with a vacuum maintainer which is a duplicate of the device shown in Fig. 2 of the drawings. This is necessary to prevent too much air from being drawn into the cleaning units. The vacuum will be maintained in the discharge 32. Ordinarily the pickers 25 and beaters 24 will move the cotton forwardly towards the discharge 17.

The cotton will be beaten and picked and sufficiently agitated to clear it of trash and dirt. The trash and dirt fall through the screens 18 down into the lower part of the casings of the units 1 to 6 inclusive. Sufficient spiral conveyors 22 are provided in the lower parts of the casings to move the dirt and trash into the discharge 32. The shafts of the picker and beater rollers and the shaft of the vacuum maintainer are to be driven by any suitable power. In operation, the cotton is fed to the inlet 27. A suction draft is created for this purpose by a fan 28. This draft cooperates with the picker and beater rollers to move the cotton on past the picker and beater rollers and the dust and trash are thrown downwardly through the screens 18. The cotton is discharged through the outlet 17 by means of the vacuum maintainer. The vacuum maintainer and the spiral conveyors are all driven at the same time.

The vacuum maintainer may be placed in any one of the units 1 to 6 inclusive. If the vacuum maintainer is placed in the unit 5 at 33, the opening 20 would be closed and the air would be discharged through an opening 34 instead of the opening 35. The trash and dirt would be removed through opening 32 and the cotton would move on through the other units as usual being moved by the beaters 24 and pickers 25 and discharged through the spout 17. In such case, the dirt and trash in units 5 and 6 would be discharged through opening 32 and the dirt and trash in units 1 to 4 inclusive would be discharged through an opening 36 which would need no vacuum maintainer.

With the construction above set forth, a part of the units may be used to clean in and with the aid of the air draft while the other units can be used to clean the cotton with the beaters and pickers without the use of the air. In the latter case, the trash and dirt would be removed by agitation and gravity.

In case of what is known as "bolly" cotton, means must be provided to crush or break the bolls or hulls. Boll breaking means are provided in unit 6. A corrugated roller 38 is provided and a corrugated crusher board 39 is provided to cooperate with the roller 38. The "bolly" cotton is run between the roller 38 and the board 39. The bolls or hulls will be sufficiently broken so that parts thereof will be removed with other trash and the coarser particles will pass on the cotton to be removed by hull extractors. The board 39 is yieldingly mounted to prevent clogging.

What I claim, is,—

1. A cotton cleaning machine comprising a series of units detachably connected together and provided with openings for permitting the passage of cotton and air through said units, each intermediate unit being complete in itself and having an overlapping member for attachment to the preceding unit and cleats for attaching the bottoms of the units together, bearing bars for said units set at inclines upwardly and forwardly, picking and beating rollers journaled on said bars cooperating with the air draft, screens under said rollers and said bearing bars supporting said screens for separating dirt and trash from the cotton, said draft openings communicating therewith in line with said screens, and means for creating drafts through said units and through said screens.

2. A cotton cleaning machine comprising a series of units detachably connected together and provided with openings for the passage of cotton through said units, each intermediate unit being complete in itself and having an overlapping member for attachment to the preceding unit and cleats for attaching the bottoms of the units together, bearing bars for each unit set at inclines upwardly and forwardly, beating and picking rollers journaled on said bearing bars for driving cotton through said openings, screens under said rollers, and a vacuum maintainer in the upper part of one of said units cooperating with said rollers for driving cotton through said units and for separating the cotton from the dirt and trash and for driving the dirt and trash through said screens.

3. A cotton cleaning machine comprising a series of detachable units, each intermediate unit being complete in itself and having an overlapping member for attachment to the preceding unit and cleats for attaching the bottoms of the units together, bearing bars for said units inclined upwardly and forwardly for positioning screens, beating and picking rollers journaled on said bearing bars, said units having openings adjacent to the last roller in each unit for the passage of cotton and air, screens under said rollers supported by said bars for the passage of dirt and trash downwardly, a vacuum maintainer in the upper part of the units cooperating with said rollers for moving the cotton through said units and for drawing dirt and trash through said screens, and means for removing dirt and trash from said units.

In testimony whereof, I set my hand, this 27th day of February, 1928.

SAMUEL WILLIAMS.